United States Patent [19]

Butti et al.

[11] 3,872,075
[45] Mar. 18, 1975

[54] SALTS OF AMINO-ACIDS WITH POLYSULFURIC ESTERS OF NATURAL GLY-COPEPTIDES AND PROCESS FOR PREPARING SAME

[75] Inventors: Adriano Butti, Como; Giuseppe Prino, Milan, both of Italy

[73] Assignee: Crinos Industria Farmacobiologica S.p.A., Villa Guardia, Italy

[22] Filed: Oct. 10, 1973

[21] Appl. No.: 405,179

[30] Foreign Application Priority Data
Oct. 18, 1972 Italy .................................. 30582/72

[52] U.S. Cl. ............................ 260/112 R, 424/177
[51] Int. Cl. ............................................... C07g 7/00
[58] Field of Search ................................ 260/112 R

[56] References Cited
UNITED STATES PATENTS
3,518,243   6/1970   Butti et al. ...................... 260/112 R OTHER PUBLICATIONS
Dissertation Abstracts B, Vol. 31, 6, October, 1970, p. 1710-B, Pamer Chem. Abstracts, Vol. 75, 1971, 108396W, Prino et al.

*Primary Examiner*—Howard E. Schain
*Attorney, Agent, or Firm*—Browdy and Neimark

[57] ABSTRACT

A process for obtaining salts of amino-acids with polysulfuric esters of glycopeptides comprises reacting an aqueous solution of a sulfoglycopeptide in the acid form with a slight excess of one or more free amino-acids, dialysing the solution of the obtained salt and finally separating the product by dilution and precipitation with selective solvents or by concentration under reduced pressure followed by a lyophilization process. The thus obtained salts of natural or synthetic amino-acids with sulfoglycopeptides possess a remarkable anti-inflammatory pharmacological action useful for treating gastro-duodenal ulcerous phenomena without dangerous side effects.

15 Claims, No Drawings

SALTS OF AMINO-ACIDS WITH POLYSULFURIC ESTERS OF NATURAL GLY-COPEPTIDES AND PROCESS FOR PREPARING SAME

BACKGROUND OF THE INVENTION

This invention relates to a group of new salts derived from suphated glycopeptides and to a process for preparing same.

There are known salts of polysulfuric esters of glycopeptides (sulfoglycopeptides) with alkali, alkaline earth and heavy metals which have anti-inflammatory properties. To be used in therapy, said salts however require particular treatments after they are obtained, or particular application precautions suited to reduce the toxicity thereof. This is particularly applicable to salts derived from heavy metals of alkaline earth metals such as barium, which generally have a higher or lower toxicity degree.

SUMMARY OF THE INVENTION

It has now been found and is one object of this invention that it is possible to obtain from the aforesaid sulfoglycopeptides also salts with natural or synthetic amino-acids. These salts are practically free from any toxic activity and have an anti-inflammatory activity higher than that of the already known sulfoglycopeptide salts. Accordingly, one object of this invention consists in obtaining salts of sulfoglycopeptides with natural or synthetic amino-acids.

Another object of this invention consists in providing a process for preparing said salts starting from sulfoglycopeptides in the acid form and from free amino-acid.

DESCRIPTION OF THE PREFERRED EMBODIMENT

The glycopeptide polysulfuric ester is preferably obtained in its form of free acid starting from the corresponding sodium or ammonium salt by dissolving it in water and percolating it through a bed of strong cationic resin like, e.g., the type known under the trade name of AMBERLITE IR 120 produced by ROHM and HAAS company. The aqueous solution obtained further to this treatment contains the acid form of the sulfoglycopeptide and is characterized by a strong acidity corresponding to a pH lower than 1.

To the thus obtained sulfoglycopeptide acid solution is added directly the free amino-acid if the latter is available under such form, otherwise an aqueous solution of the amino-acid prepared separately is added if the latter is available in the form of a derivative, e.g., as a salt. The quantity of the amino-acid added to the sulfoglycopeptide acid solution is preferably slightly higher (5 percent) than the stoichiometrically required quantity.

The thus obtained aqueous solutions of the product are characterized by a pH value which depends on the nature of the amino-acid employed. Said value is normally lower than 3 in the case of neutral and acidic amino-acids, while it is close to neutrality in the case of basic amino-acids. In order to remove from the thus obtained solutions in fraction of amino-acid in excess or possibly present inorganic salts, said solutions may be subjected to an adequate dialysis treatment before separating the product.

The separation and purification of the product, consisting of the salt of sulfoglycopeptide with the amino-acid, from its aqueous solutions may finally be carried out in two different ways:

A. by precipitation after dilution with selective solvents and subsequent drying under vacuum at about 50°C (the expression "selective solvent" means a solvent mixable in water wherein the salt to be purified is insoluble) or B. by concentration under reduced pressure followed by lyophilization.

As preferred sulfoglycopeptides, there may be used those derived from animal organs or tissues according to the process described in U.S. Pat. No. 3,518,243 to A. Butti et al.

This patent claims in claim 1:

"1. A process for preparing a sulfonated product of a glucopeptide from the gastric mucosa or duodenum of swine, comprising:

a. hydrolyzing the animal organ in water at a temperature from about 50°C. to about 100°C. for from about 10 minutes to about 45 minutes at a pH from about 1 to 10;

b. removing acidic hydrolysis by-products obtained by the hydrolysis of (a);

c. diluting the product of (b) with a non-solvent therefore whereby a glycopeptide is precipitated therefrom;

d. suspending the product of (c) in a heterocyclic tertiary base having a boiling point of from about 100°C. to about 200°C.;

e. contacting the resulting suspension of (d) with a sulfonating agent selected from the group consisting of sulfuric acid, oleum, chlorosulfonic acid and an adduct of sulfuric anhydride and an organic compound, at a temperature from about −40°C. to about 0°C. and then a temperature from about 50°C. to about 80°C., and recovering the resulting sulfonated product."

Claim 7 of this patent states:

"7. The process of claim 1 wherein the sulfonated product recovered in (e) is (f) reacted with a hydroxide selected from the group consisting of an alkali metal hydroxide, an alkaline earth metal hydroxide and ammonium hydroxide, whereby the sulfonated product is converted to its corresponding alkali, alkaline earth metal or ammonium salt, and the resulting product is (g) contacted with acetone or methyl alcohol whereby said salt is precipitated."

The salts of said sulfoglycopeptides with natural or synthetic amino-acids exercise a considerable anti-inflammatory pharmacological action and appeared particularly useful as medicine in treating both stomach and duodenum ulcerous phenomena. Actually, in the tests conducted on experimental animals, they showed the following pharmacological properties:

A. reduction of ulcer due to ligature of pylorus and to hydrocortisone and histamine at a dose of 10–20 mg/kg endoperitoneally and 50–100 mg/kg orally;

B. inhibition of peptic activity of gastric juice both "in vivo" (50 mg/kg orally) and "in vitro" (100 μg/ml);

C. increase in cicatrization velocity of chronical experimental ulcers at a dose of about 100 mg/kg/day, orally;

3

D. inhibition of local oedema in rats due to carragheenin, serotonin and kaolin, at a dose of 3-5 mg/kg, parenterally;

E. inhibition of hypersecretion induced in rats with histamine, gastrine and betanechol (carbinoyl-beta-methylcholine) at a dose of 1 mg/kg, intravenously.

No toxic phenomena were observed either in rats or mice after a single treatment with 3000 mg/kg, orally.

The salts according to this invention and the relevant process for preparing same will now be better described in the following examples which are given by way of non-limiting illustration of this invention.

EXAMPLE 1

Histidine salt of sulfoglycopeptide 20 g of the sodium salt of sulfoglycopeptide are dissolved in 200 cm³ of distilled water and percolated through a bed of cationic exchange resin AMBERLITE IR 120 (H⁺) contained in a column having a 25 mm diameter. The resin is subsequently washed with another 150 cm³ of distilled water which are added to the already percolated liquid; to the thus obtained solution is added a solution of histidine prepared by treating a solution of 18 g of histidine hydrochloride in 100 cm³ water with 3.7 g of sodium hydrate.

After the reaction, the whole is diluted with 1500 cm³ of ethanol, the precipitate is collected by centrifuging and it is washed three times with an ethanol/water solution in a ratio of 3 to 1 by volume. The obtained powder is finally dried under vacuum at 50°C. 22 g of product are obtained which upon analysis give the following percentages expressed by weight:

| | |
|---|---|
| Histidine | = 35% |
| Sulfoglycopeptide | = 65% |
| Nitrogen | = 11,65% |
| Sulfonic sulfur | = 10,16% |
| Sodium | = 1,45% |
| Hexoses | = 9,9% |
| Hexosamines | = 12,8% |
| Acetyl groups | = 3,4% |
| Sialic acid* | = 1,85% |
| Proteins | = 6,3% |
| Moisture | = 4,5% |

*= N-acetyl-neuraminic acid.

EXAMPLE 2

Lysine salt of sulfoglycopeptide

The lysine salt of sulfoglycopeptide is prepared similarly to the method illustrated in the preceding example starting from 16 g of lysine monohydrochloride and 20 g of sulfoglycopeptide in the form of sodium salt. 21.7 g of product were obtained which upon analysis gave the following gravimetric percentages:

| | |
|---|---|
| Lysine | = 34% |
| Sulfoglycopeptide | = 66% |
| Sulfonic sulfur | = 10,24% |
| Sodium | = 2,01% |
| Nitrogen | = 8,78% |
| Hexoses | = 10,2% |
| Hexosamines | = 13,5% |
| Acetyl groups | = 3,6% |
| Sialic acid | = 1,92% |
| Proteins | = 6,4% |
| Moisture | = 4,7% |

EXAMPLE 3

Glutamine salt of sulfoglycopeptide 25 g of the sodium salt of sulfoglycopeptide are dissolved in 250 cm³ of distilled water and percolated through a bed of exchange resin AMBERLITE IR 120 (H⁺) contained in a column having a 25 mm diameter. The resin is subsequently washed with another 150 cm³ of distilled water which are added to the already percolated liquid; the solutions put together are added under stirring 15.5 g of l-glutamine. The pH of the obtained solution amounts to 2.5. The solution is then dialyzed for one night at a temperature of 4°C against distilled water through a regenerated cellulose membrane having a thickness of 0.03 millimeters. The solution is concentrated under reduced pressure and at a temperature of 40°C down to a total volume of 200 cm³ and this is then lyophilized. The analysis of the 35 g of product obtained gives the following data:

| | |
|---|---|
| Glutamine | = 42% |
| Sulfoglypeptide | = 58% |
| Nitrogen | = 10,04% |
| Sulfonic sulfur | = 9,05% |
| Sodium | = 0,5% |
| Hexoses | = 8,9% |
| Xexosamines | = 10,8% |
| Acetyl groups | = 2,9% |
| Sialic acid | = 2,9% |
| Proteins | = 5,4% |
| Moisture | = 4,4% |

EXAMPLE 4

Methionine salt of sulfoglycopeptide 25 g of the sodium salt of sulfoglycopeptide are dissolved in 250 cm³ of distilled water and percolated through a bed of exchange resin AMBERLITE IR 120 (H⁺) contained in a column having a 25 mm diameter. The resin is subsequently washed with another 150 cm³ of distilled water which are added to the already percolated solution; the solutions put together are added under stirring 15 g of dl-methionine. The solution is dialyzed for 12 hours at a temperature of 4°C against distilled water through a regenerated cellulose membrane having a thickness of 0.03 millimeters. This is then concentrated under reduced pressure and at 40°C until a total volume of 200 cm² is obtained, which are then lyophilized. 35.4 g of product are obtained which upon analysis give the following data expressed in percent by weight.

| | |
|---|---|
| Methionine | = 43,4% |
| Sulfoglycopeptide | = 56,5% |
| Nitrogen | = 6% |
| Sulfonic sulfur | = 9,95% |
| Sodium | = 0,5% |
| Hexoses | = 8,7% |
| Hexosamines | = 10,5% |
| Acetyl groups | = 2,8% |
| Sialic acid | = 1,5% |
| Proteins | = 5,3% |
| Moisture | = 4,6% |

EXAMPLE 5
Asparagine salt of sulfoglycopeptide

The asparagine salt of sulfoglycopeptide was prepared following the process illustrated in examples 3 and 4. The final product gave upon analysis the following percentages:

| | |
|---|---|
| Asparagine | = 35% |
| Sulfoglycopeptide | = 65% |
| Nitrogen | = 9,6% |
| Sulfonic sulfur | = 10,1% |
| Sodium | = 0,4% |
| Hexoses | = 9,4% |
| Hexosamines | = 13,00% |
| Acetyl groups | = 3,4% |
| Sialic acid | = 1,8% |
| Proteins | = 6,2% |
| Moisture | = 4,5% |

Still according to the process illustrated in Examples 3 and 4 there were prepared other salts of sulfoglycopeptide with different amino-acids, the analytical data of which are summarized in the following table:

| Example | Amino-acid | Analysis (% by weight) | | | | | | | |
|---|---|---|---|---|---|---|---|---|---|
| | | Amino-acid | N | Sulfon.S | Na | Hexoses | Hexos-amines | Acetyl groups | Sialic acid | Proteins |
| 6 | Arginine | 44,0 | 16,5 | 9,0 | 0,5 | 8,7 | 10,0 | 2,8 | 1,5 | 5,3 |
| 7 | Cysteine | 36,0 | 6,15 | 10,0 | 0,7 | 9,0 | 12,7 | 3,3 | 1,7 | 6,0 |
| 8 | Proline | 37,0 | 6,5 | 9,8 | 0,5 | 9,6 | 13,2 | 3,5 | 1,77 | 5,9 |
| 9 | Serine | 32,5 | 6,6 | 10,62 | 0,4 | 10,5 | 13,5 | 3,6 | 1,9 | 6,4 |
| 10 | Threonine | 36,0 | 6,2 | 10,04 | 0,5 | 9,0 | 12,5 | 3,4 | 1,55 | 6,0 |
| 11 | Tryptophane | 56,0 | 9,1 | 6,8 | 0,5 | 8,6 | 8,6 | 2,1 | 1,25 | 4,2 |

What we claim is:

1. In the process for preparing sulfoglycopeptide salts comprising:
    a. hydrolyzing the gastric mucosa or duodenum of swine in water at a temperature from about 50°C. to about 100°C. for from about 10 minutes to about 45 minutes at a pH from about 1 to 10;
    b. removing acidic hydrolysis by-products obtained by the hydrolysis of (a);
    c. diluting the product of (b) with a non-solvent therefore whereby a glycopeptide is precipitated therefrom;
    d. suspending the product of (c) in a heterocyclic tertiary base having a boiling point of from about 100°C. to about 200°C.;
    e. contacting the resulting suspension of (d) with a sulfonating agent selected from the group consisting of sulfuric acid, oleum, chlorosulfonic acid and an adduct of sulfuric anhydride with an organic compound, at a temperature from about −40°C. to about 0°C. and then a temperature from about 50°C. to about 80°C., and recovering the resulting sulfonated product;
    f. reacting the product recovered in (e) with a hydroxide selected from the group consisting of an alkali metal hydroxide, an alkaline earth metal hydroxide and ammonium hydroxide, whereby the sulfonated product is converted to its corresponding alkali, alkaline earth metal or ammonium salt; and
    g. contacting the product resulting from (f) with acetone or methyl alcohol whereby said salt is precipitated, the improvement wherein an amino acid salt of sulfoglycopeptide is prepared, comprising:
    1. contacting an aqueous solution of the salt which is the product of (g) with a strongly cationic ion exchange resin whereby said sulfoglycopeptide salt is converted into a free acid; and
    2. contacting said free acid resulting from (1) with an alpha-amino acid selected from the group consisting of glutamine, methionine, histidine, lysine, asparaginine, arginine, cysteine, proline, serine, threonine, and tryptophane.

2. The salt produced by the process of claim 1.

3. The process for preparing sulfoglycopeptides salts according to claim 1, wherein the obtained product is separated by precipitation using selective solvents and by subsequent drying under vacuum.

4. The process for preparing sulfoglycopeptides salts according to claim 1, wherein the product is separated by concentration under reduced pressure and by subsequent lyophilization.

5. A salt according to claim 2, wherein the alpha-amino-acid is glutamine.

6. A salt according to claim 2, wherein the alpha-amino-acid is methionine.

7. A salt according to claim 2, wherein the alpha-amino-acid is histidine.

8. A salt according to claim 2, wherein the alpha-amino-acid is lysine.

9. A salt according to claim 2, wherein the alpha-amino-acid is asparagine.

10. A salt according to claim 2, wherein the alpha-amino-acid is arginine.

11. A salt according to claim 2, wherein the alpha-amino-acid is cysteine.

12. A salt according to claim 2, wherein the alpha-amino-acid is proline.

13. A salt according to claim 2, wherein the alpha-amino-acid is serine.

14. A salt according to claim 2, wherein the alpha-amino-acid is threonine.

15. A salt according to claim 2, wherein the alpha-amino-acid is tryptophane.

* * * * *